(12) United States Patent
Silva

(10) Patent No.: US 10,291,355 B2
(45) Date of Patent: May 14, 2019

(54) EMBEDDED SYSTEM AND METHOD THEREOF

(71) Applicant: SK hynix Inc., Gyeonggi-do OT (KR)

(72) Inventor: Stephen J. Silva, Fort Collins, CO (US)

(73) Assignee: SK hynix Inc., Gyeonggi-do (KR)

( * ) Notice: Subject to any disclaimer, the term of this patent is extended or adjusted under 35 U.S.C. 154(b) by 130 days.

(21) Appl. No.: 15/044,997

(22) Filed: Feb. 16, 2016

(65) Prior Publication Data
US 2016/0241361 A1 Aug. 18, 2016

Related U.S. Application Data

(60) Provisional application No. 62/117,200, filed on Feb. 17, 2015.

(51) Int. Cl.
*H04L 1/00* (2006.01)
*G06F 11/10* (2006.01)
*H04L 29/06* (2006.01)

(52) U.S. Cl.
CPC ........ *H04L 1/0061* (2013.01); *G06F 11/1004* (2013.01); *H04L 69/163* (2013.01)

(58) Field of Classification Search
CPC ... H04L 1/0061; H04L 69/163; G06F 11/1004
See application file for complete search history.

(56) References Cited

U.S. PATENT DOCUMENTS

| | | | | |
|---|---|---|---|---|
| 2006/0050737 | A1* | 3/2006 | Hsu | H03M 13/096 370/474 |
| 2009/0327588 | A1 | 12/2009 | Sutardja et al. | |
| 2013/0346667 | A1* | 12/2013 | Stroud | G06F 13/385 710/316 |
| 2015/0081726 | A1* | 3/2015 | Izenberg | H04L 47/2433 707/755 |

OTHER PUBLICATIONS

Information Technology Industry Council, ANSI INCITS 406-2005, "Automation/Drive Interface—Transport Protocol (ADT)", May 19, 2005.*
Information Technology Industry Council, ANSI INCITS 406-2005, "Automation/Drive Interface—Transport Protocol (ADT)", May 19, 2005 (Year: 2005).*

* cited by examiner

*Primary Examiner* — Cynthia Britt
*Assistant Examiner* — Rong Tang
(74) *Attorney, Agent, or Firm* — IP & T Group LLP

(57) ABSTRACT

An embedded system may include an embedded device and a host device. The embedded device may provide a packet for a service, and generate a first transmission control protocol (TCP) segment including a piece of the packet and a first header with no checksum value. The host device may receive the first TCP segment, generate a second TCP segment including the piece of the packet and a second header with a checksum value based on the piece of the packet and the first header, and generate an Internet protocol (IP) packet based on the second TCP segment.

16 Claims, 6 Drawing Sheets

EMBEDDED SYSTEM AND METHOD THEREOF

CROSS-REFERENCE TO RELATED APPLICATIONS

This application claims the benefit of U.S. Provisional Application No. 62/117,200 filed Feb. 17, 2015, the entire contents of which are incorporated herein by reference.

BACKGROUND

1. Field

Exemplary embodiments of the present disclosure relate to an embedded system and a method for operating the embedded system.

2. Description of the Related Art

Generally, an embedded system includes an embedded device and a host device. Recently, for the embedded device, a memory device such as a solid state drive (SDD) is used.

SUMMARY

Embodiments of the present disclosure are directed to an embedded system including an embedded device and a host device, and a method thereof.

Aspects of the invention include a system including an embedded device and a host device. The embedded device may provide a packet for a service, and generate a first transmission control protocol (TCP) segment including a piece of the packet and a first header with no checksum value. The host device may receive the first TCP segment, generate a second TCP segment including the piece of the packet and a second header with a checksum value based on the piece of the packet and the first header, and generate an internet protocol (IP) packet based on the second TCP segment.

Further aspects of the invention include a method operating an embedded system including an embedded device and a host device. The method may include: providing, by the embedded device, a packet for a service; generating, by the embedded device, a first transmission control protocol (TCP) segment including a piece of the packet and a first header with no checksum values, receiving, by the host device, the first TCP segment; generating, by the host device, a second TCP segment including the piece of the packet and a second header with a checksum value based on the piece of the packet and the first header; and generating, by the host device, an internet protocol (IP) packet based on the second TCP segment.

Still further aspects of the invention include an embedded device for an embedded system. The embedded device may include: at least one service provider suitable for providing a packet for a service; a processing unit suitable for generating a transmission control protocol (TCP) segment including a piece of the packet and a header with no checksum value; and an interface unit suitable for transmitting the TCP segment to a host device.

Additional aspects of the invention include a host device for an embedded system. The host device may include: an interface unit suitable for receiving, from an embedded device, a first transmission control protocol (TCP) segment including a piece of a packet for a service and a first header with no checksum value; a first processing unit suitable for calculating a checksum value based on the piece of the packet and the first header and generating a second TCP segment including the piece of the packet and a second header with the checksum value; a second processing unit suitable for performing an internet protocol (IP) routing, and generating an internet protocol (IP) packet based on, the second TCP segment; and a third processing unit suitable for generating a transmission frame based on the IP packet, and transmitting the transmission frame to a network.

DETAILED DESCRIPTION

Figure 1:
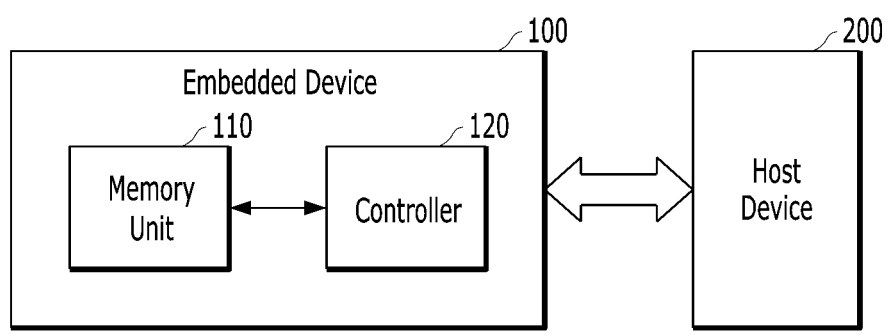
FIG. 1 is a block diagram of an embedded system.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The invention can be implemented in numerous ways, including as a process; an apparatus; a system; a composition of matter; a computer program product embodied on a computer readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily suitable for performing the task at a given time or a specific component that is manufactured to perform the task. As used herein, the term 'processor' refers to one or more devices, circuits, and/or processing cores suitable for processing data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of the present invention will be described herein which provides the ability to use common, industry standard connections to manage or otherwise communicate with an embedded device through an interface. These embodiments allow embedded devices to use this common, ubiquitous infrastructure for management and monitoring. These embodiments are to enable a service on an embedded device of an embedded system as shown in FIG. 1, and use that service in an industry standard way through the internet.

FIG. 1 illustrates a diagram illustrating an embedded system (or a data processing system) 10.

Referring to FIG. 1, the embedded system 10 may include an embedded device 100 and a host device 200.

The host device 200 may be implemented with any one of various kinds of electronic devices. In some embodiments, the host device 200 may include an electronic device such as e a desktop computer, a workstation, a three-dimensional (3D) television a smart television, a digital audio recorder, a digital audio player, a digital picture recorder, a digital picture player a digital video recorder and a digital video player. In some embodiments, the host device 200 may include a portable electronic device such as a mobile phone, a smart phone, an e-book, an MP3 player, a portable multimedia player (PMP), and a portable game player.

The embedded device 100 may operate in response to a request from the host device 200, and in particular, store data to be accessed by the host device 200. In some embodiments, the embedded device 100 may be implemented with a storage device such as a solid state drive (SSD). In some embodiments, the embedded device 100 may be implemented with any one of various kinds of storage devices such as a multimedia card (MMC), an embedded MMC (eMMC), a reduced size MMC (RS-MMC) and a micro-MMC, a secure digital (SD) card, a mini-SD and a micro-SD, a universal serial bus (USB) storage device, a universal flash storage (UFS) device, a compact flash (CF) card a smart media (SM) card, a memory stick, and so forth.

The embedded device 100 may include a memory unit 110 which stores data to be accessed by the host device 200, and a controller 120 which controls storage of data in the memory unit 110.

The memory unit 110 for the embedded device 100 may be implemented with a volatile memory device such as a dynamic random access memory (DRAM) and a static random access memory (SRAM) or a non-volatile memory device such as a read only memory (ROM), a mask ROM (M ROM a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM) and a resistive RAM (RRAM).

The controller 120 of the embedded device 100 may control the memory unit 110 in response to a request from the host device 200. The controller 120 may provide the data read from the memory unit 110, to the host device 200, and store the data provided from the host device 200 into the memory unit 110.

In some embodiments, the embedded device 100 may configure a storage configuring a data center, a device capable of transmitting and receiving information under a wireless environment, one of various electronic devices configuring a home network, one of various electronic devices configuring a computer network, one of various electronic devices configuring a telematics network, an RFID device, or one of various component elements configuring computing system.

Figure 2:
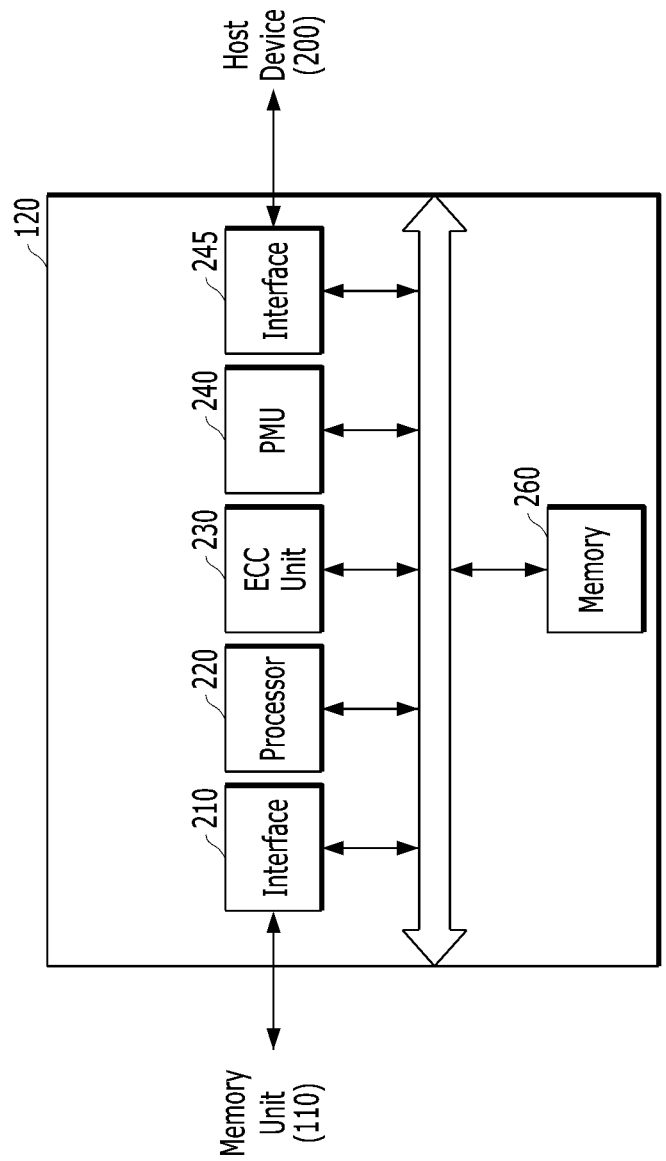
FIG. 2 is a block diagram for a controller of an embedded device.

FIG. 2 is a block diagram for a controller 120 of an embedded device 100 shown in FIG. 1.

Referring to FIG. 2, the controller 120 may include an interface 210, a processor 220, an error correction code (ECC) unit 230, a power management unit (PMU) 240, an interface 245 and a memory 260.

The interface 210 may provide an interface between the controller 120 and the memory unit 110 to allow the controller 120 to control the memory unit 110 in response to a request from the host device 200. The interface 210 may generate control signals for the memory unit 110 and process data under the control of the processor 220. When the memory unit 110 is a flash memory such as a NAND flash memory, the interface 210 may generate control signals for the NAND flash memory 110 and process data under the control of the processor 220.

The processor 220 may control general operations of the embedded device 100, and a write operation or a read operation for the memory unit 110, in response to a write request or a read request from the host device 200. The processor 220 may drive firmware, which is referred to as a flash translation layer (FTL), to control the general operations of the embedded device 100. The processor 220 may be implemented with a microprocessor or a central processing unit (CPU).

The ECC unit 230 may detect and correct errors in the data read from the memory unit 110 during the read operation. The ECC unit 230 may not correct error bits when the number of the error bits is greater than or equal to a threshold number of correctable error bits, and may output an error correction fail signal indicating failure in correcting the error bits.

The ECC unit 230 may perform an error correction operation based on a coded modulation such as a low density parity check (LI PC) code, a Bose-Chaudhuri-Hocquenghem (BCH) code, a turbo code, a turbo product code (TPC), a Reed-Solomon (RS) code, a convolution code, a recursive systematic code (RSC) a trellis-coded modulation (TCM), a Block coded modulation (BCM), and so on. The ECC unit 230 may include all circuits, systems or devices for the error correction operation.

The PMU 240 may provide and manage power for the controller 120, that is, power for the component elements included in the controller 120.

The interface 245 may process commands and data provided from the host device 200, and may communicate with the host device 200 through any one of various interface protocols. In some embodiments, the interface 245 may provide an interface between the embedded device 100 and the host device 200 through a serial connection. For example, the interface 245 may provide the interface in accordance with an automation/drive interface transport (ADT) protocol.

The memory 260 may serve as a working memory of the embedded device 100 and the controller 120, and store data for driving the embedded 100 and the controller 120. The controller 120 may control the memory unit 110 in response to a request from the host device 200. For example, the controller 120 may provide the data read from the memory unit 110 to the host device 200 and store the data provided from the host device 200 in the memory unit 10. When the controller 120 controls the operations of the memory unit 110, the memory 260 may store data used by the controller 120 and the memory unit 110 or such operations as read, write, program and erase operations.

The memory 260 may be implemented with volatile memory. The memory 260 may be implemented with a static random access memory (SRAM) or a dynamic random access memory (DRAM). As described above, the memory 260 may store data used by the host device 200 and the memory unit 110 for the read and write operations. To store the data, the memory 260 may include a program memory, a data memory, a write buffer, a read buffer, a map buffer, and so forth.

Figure 3:
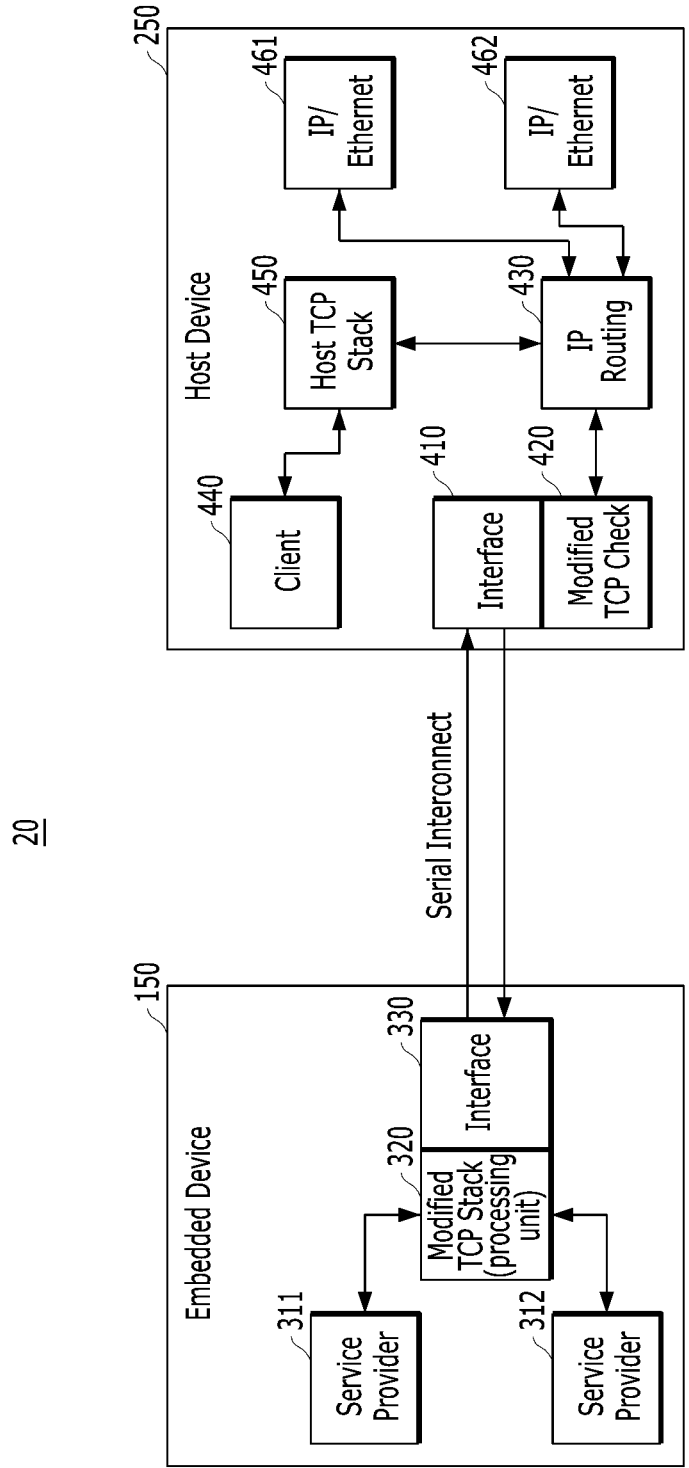
FIG. 3 is a block diagram illustrating an embedded system including an embedded device and a host device in accordance with an embodiment of the present disclosure.

FIG. 3 is a block diagram illustrating an embedded system 20 including an embedded device 150 and a host device 250 in accordance with an embodiment of the present disclosure. In examples of the invention, the embedded system 20, embedded device 150 and host device 250 may be similar in construction and functionality as embedded system 10, embedded device 100, and host device 200 respectively, as described with reference to FIGS. 1 and 2.

Referring to FIG. 3, the embedded system 20 may provide the ability to use common, industry standard connections to manage or otherwise communicate with the embedded device 150 through a serial interconnection. This technique may allow the embedded device 150 to use this common, ubiquitous infrastructure for management and monitoring.

The embedded system 20 may enable a service on the embedded device 150 such as a solid state drive (SSD) and use that service in an industry standard way through the internet. The embedded device 150 may be connected to the host device 250 through a serial interconnect. One or more service providers 311-312 may be located on the embedded device 150. The client for the service provided by the embedded device 150 may be located anywhere on a network (i.e., the internet) where the device is visible. In some embodiments, as shown in FIG. 3, the client 440 may be located in the host device 250. Alternatively, the client 440 may be located on the internet (not shown) connected through the host device 250.

The embedded device 150 may include a plurality of service providers (e.g., two service provides) 311-312, a processing unit 320 and an interface unit 330.

Each of the service providers 311-312 may provide a packet for a service. Examples of services for the embedded device 150 such as the SSD may include a load profile service, drive health monitor, capacity used monitor, bad block count profile, end of life alert service, drive configuration service or any type of SMART counter harvesting service.

The interface unit 330 may be coupled to the processing unit 320, and may transmit a transmission control protocol (TCP) segment generated by the processing unit 320 to the host device 250. The interface unit 330 may be a serial interface for a serial interconnect between the embedded device 150 and the host device 250. In some embodiments, the interface unit 330 may be implemented with a serial interface based on an automation drive interface-transport (ADT) protocol.

The processing unit (modified TCP stack) 320 may present an industry standard transmission control protocol (TCP) interface to any service providers 311-312. For outgoing TCP packets, the processing unit 320 may do the job of a typical TCP stack except that it uses the ADT layer rather than an internet protocol (IP) layer it would normally use. In other words, the processing unit 320 may do the job of a modified TCP stack. In detail, the processing unit 320 may generate a TCP segment corresponding to the packet for the service. In some embodiments, the packet may be divided some pieces, and the TCP segment may include a piece of the packet and a header with no checksum value.

The host device 250 may include an interface unit 410, a first processing unit 420, a second processing unit 430, and at least one of a third processing unit 461 and a fourth processing unit 462. Furthermore, the host device 250 may include a client 440 and a host TCP stack 450.

The interface unit 410 may receive the TCP segment generated by the processing unit 320 of the embedded device 150. The interface unit 410 may be a serial interface for a serial interconnect between the embedded device 150 and the host device 250. In some embodiments, the interface unit 410 may be implemented with a serial interface based on an automation/drive interface-transport (ADT) protocol.

The first processing unit 420 may perform a TCP check summing operation for the TCP segment received from the embedded device 150 through the interface unit 410 to calculate the checksum value based on the TCP segment and generate a new TCP segment including a header with the checksum value. In other words, the first processing unit 420 may do the job of a modified TCP check. Further, the first processing unit 420 may connect the new TCP segment to the second processing unit 430 for IP routing.

The second processing unit 430 may perform the IP routing for the TCP segment generated by the first processing unit 420. Since the embedded device 150 resembles any host on the internet with its own IP address and its own set of services, the second processing unit 430 may perform the IP routing. If the client is located in the host device 250 as the client 440, the second processing unit 430 may perform the IP routing toward the client 440 through the host TCP stack processing unit 450. If the client is located on the internet through the host device 250, the second processing unit 430 may perform the IP routing toward the third and fourth processing units 461-462.

Each of the third and fourth processing units 461-462 may receive the TCP segment generated by the first processing unit 420 from the second processing unit 430, and generate an internet protocol (IP) packet based on the TCP segment generated by the first processing unit 420. Furthermore, each of the third and fourth processing units 461-462 may generate a transmission frame based on the IP packet, and transmit the transmission frame to the network (i.e., Ethernet).

As shown in FIG. 3, the interface units 330 and 410 as the industry standard ADT transport layer may be implemented on either side of the serial link. This transport layer is described in the committee T10 document for small computer system interface (SCSI) over Serial. The transport layer implements a scheme by which the link runs as fast as both sides can handle and guarantees lossless delivery of the data.

The processing unit 320 as the modified TCP stack may reside on the embedded device 150, and present an industry standard TCP interface to any service providers 311-312 present in the embedded device 150. For outgoing TCP packets, the processing unit 320 does the job of the typical TCP stack except that it uses the ADT layer rather than the IP layer. The processing unit 320 does not perform TCP check summing to guarantee lossless delivery of the packet, which relieves the embedded device 150 of this computation intensive job. Furthermore, the processing unit 320 also does not perform TCP checksum testing on incoming packets. This also relieves the embedded device 150 of this computation intensive job. Instead, all of the TCP check summing is done on the processing unit 420 as the Modified TCP check component present on the host device 250 of the serial link. The host device 250, which typically has much more computing power than the embedded device 150, is therefore responsible for the TCP check summing. The processing unit 420 as the modified TCP check component is also responsible for connecting to the processing unit 430 for the IP routing of the host device 250. This means that IP routing in an industry standard way may be used. The embedded device 150 may look like any host on the Internet with its own IP address and its own set of services.

Although the modified TCP stack of the embedded device 150 does not perform TCP check summing or TCP checksum testing, the interface units 330 and 410 as the ADT layer may guarantee error free transmission. The interface units 330 and 410 may handle and correct bit errors generated on the link. Essentially, this is a reliable IP layer that a typical TCP assumes does not exist, hence the lightweight nature of the modified TCP stack 320 on the embedded device 150.

Embedded systems have fewer input/output (I/O) connections and processing resources compared to other systems. Embodiments of the present invention may include a serial connection between the embedded device 150 and the host device 250 which uses fewer I/O connections than Internet protocols such as TCP/IP or user datagram protocol/internet protocol (UDP/IP), but still offers high bandwidth access to the embedded system 20. Also, the embedded device 150 does not perform TCP checksum generation or TCP checksum checking, which reduces the processing load on the resource limitations of the embedded device 150. For these reasons, the embodiments of the present invention may offer an advantageous process of managing a service running on an embedded system that works within the constraints of an embedded system's I/O limitations and processing limitations.

Since the embedded device 150 may be guaranteed to be an endpoint with no possibility of forwarding IP packets through the embedded device 150, no packet routing tables or any type of IP routing are required on the embedded device 150. This also saves considerable computing resources.

In some embodiments in order to obtain the appropriate information used by the reporting or monitoring service, commands are sent to the embedded device 150 (e.g., SSD) via the host interface to harvest a set of industry standard statistics (e.g., SMART counters). Embodiments herein may make the embedded device 150 visible on the internet through a serial interface (e.g., as opposed to a host interface). The embedded device 150 then may host services that appear like any other services one would expect to find. Special clients written in any internet language such as Java can connect to these drives of the embedded device 150 and manage them through the normal local area network (LAN) in a datacenter.

In some embodiments, an embedded system may include a high speed universal asynchronous receiver/transmitter (UART). In some embodiments, the TCP time service may be used to synchronize time between the host device 250 (e.g., data center) and the embedded device 150 (e.g., SSD). This would, for example, be very valuable to the device to assist in determining downtime and age.

Figure 4:
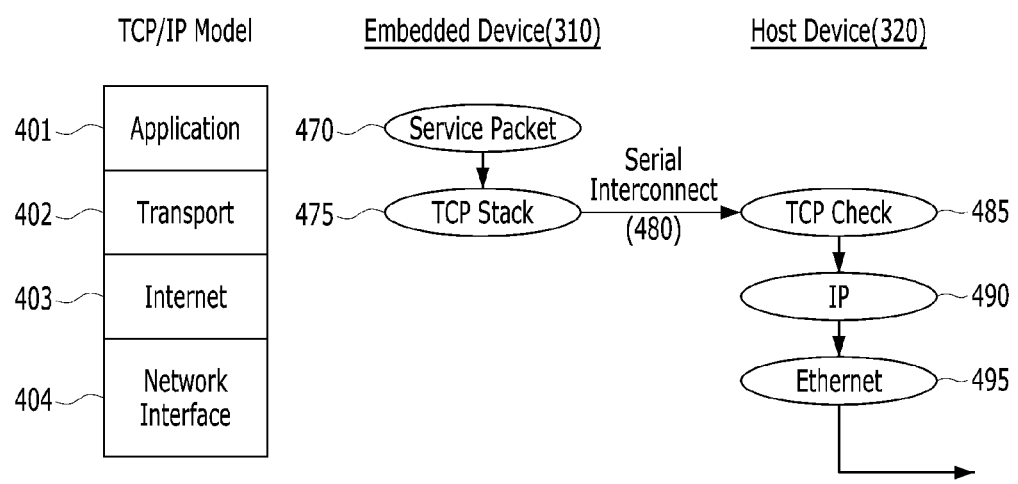
FIG. 4 is a diagram illustrating TCP/IP model of an embedded system in accordance with an embodiment of the present disclosure.

FIG. 4 is a diagram illustrating a TCP/IP model of an embedded system in accordance with an embodiment of the present disclosure. The TCP/IP model may be performed by the embedded device 150 and the host device 250 in FIG. 3 and/or the embedded device 100 and the host device 200 in FIGS. 1 and 2.

Referring to FIG. 4, the TCP/IP model may include an application layer 401, a transport layer 402, an Internet layer 403 and a network interface layer 404. The application layer 401 may be performed or implemented by the embedded device 150. The transport layer 402 may be performed or implemented by the embedded device 150 and the host device 250. The Internet layer 403 and a network interface layer 404 may be performed or implemented by the host device 250.

At the step 470, each of the service providers 311-312 of the embedded device 150 may provide a packet for a service. Examples of services for the embedded device 150, such as the SSD, may include a load profile service drive health monitor, capacity used monitor, bad block count profile, end of life alert service, drive configuration service or any type of SMART counter harvesting service.

At the step 475, the processing unit 320 of the embedded device 150 may do the job of a modified TCP stack. In detail, the processing unit 320 may generate a TCP segment corresponding the packet for the service. In some embodiments, the packet may be divided into pieces, and the TCP segment may include a piece of the packet and a header with no checksum value.

At the step 480, the interface unit 330 of the embedded device 150 may transmit a transmission control protocol (TCP) segment generated by the processing unit 320 to the host device 250.

At the step 485, the first processing unit 420 of the host device 250 may perform a TCP check summing operation for the TCP segment received from the embedded device 150 through the interface unit 410 to calculate the checksum value based on the TCP segment, and generate a new TCP segment including a header with the checksum value.

At the step 490, the second processing unit 430 of the host device 250 may perform the IP routing for the TCP segment generated by the first processing unit 420. Furthermore, each of the third and fourth processing units 461-462 may receive the TCP segment generated by the first processing unit 420 from the second processing unit 430, and generate an internet protocol (IP) packet based on the TCP segment generated by the first processing unit 420.

At the step 495, each of the third and fourth processing units 461-462 of the host device 250 may generate a transmission frame based on the IP packet, and transmit the transmission frame to the network (i.e., Ethernet).

Figure 5:
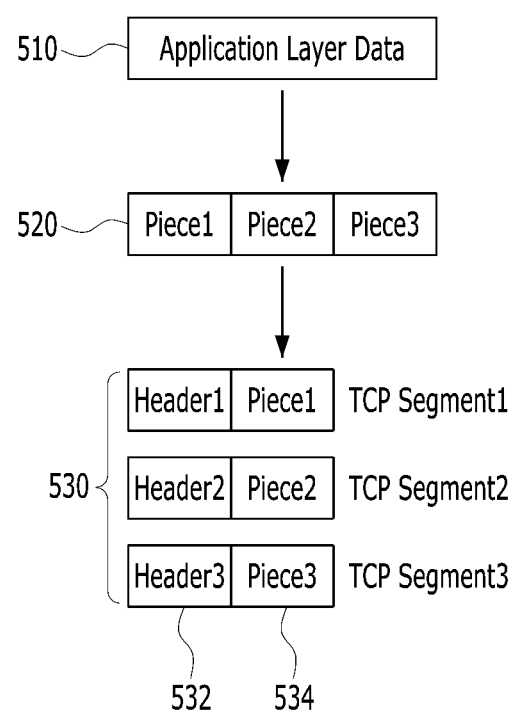
FIG. 5 is a diagram illustrating an operation of generating TCP segments in accordance with an embodiment of the present disclosure.

FIG. 5 is a diagram illustrating an operation of generating TCP segments in accordance with an embodiment of the present disclosure. For example, the operation of generating TCP segments may be performed by the processing unit 320 of the embedded device 150.

Referring to FIG. 5, the processing unit e.g., processing unit 320) may receive a packet or an application layer data 510 for a service from the service providers (e.g., service providers 311-312). The processing unit may generate a TCP segment corresponding the application layer data 510 for the service. In some embodiments, the application layer data 510 may be divided some pieces (Piece 1-Piece 3) 520, and each of the TCP segment 530 may include a piece of data 534 and a header 532 with no checksum value. For example, the TCP segment 1 may include a piece Piece 1 and a header Header 1, the TCP segment 2 may include a piece Piece 2 and a header Header 2 and the TCP segment 3 may include a piece Piece 3 and a header Header 3.

Figure 6A:
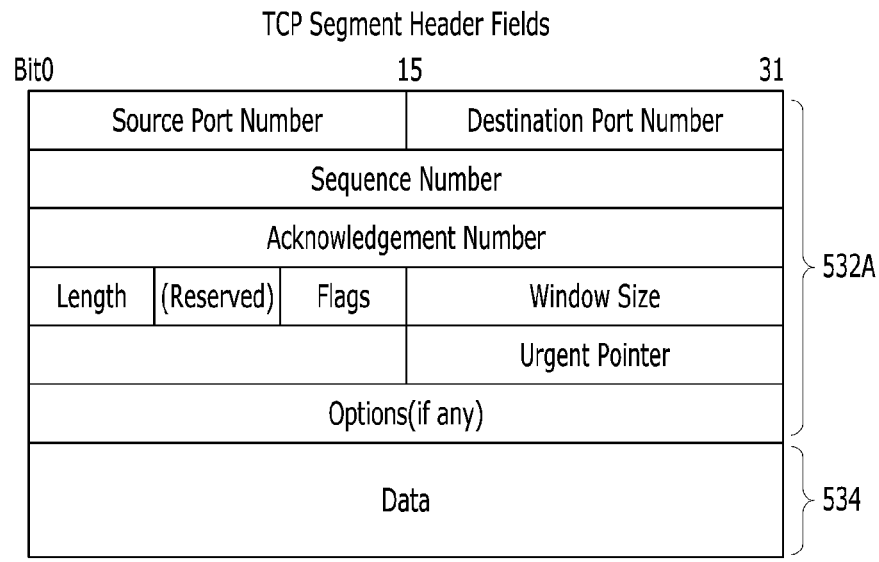
FIGS. 6A and 6B are diagrams illustrating an operation of generating a TCP segment header in accordance with an embodiment of the present disclosure.
Figure 6B:
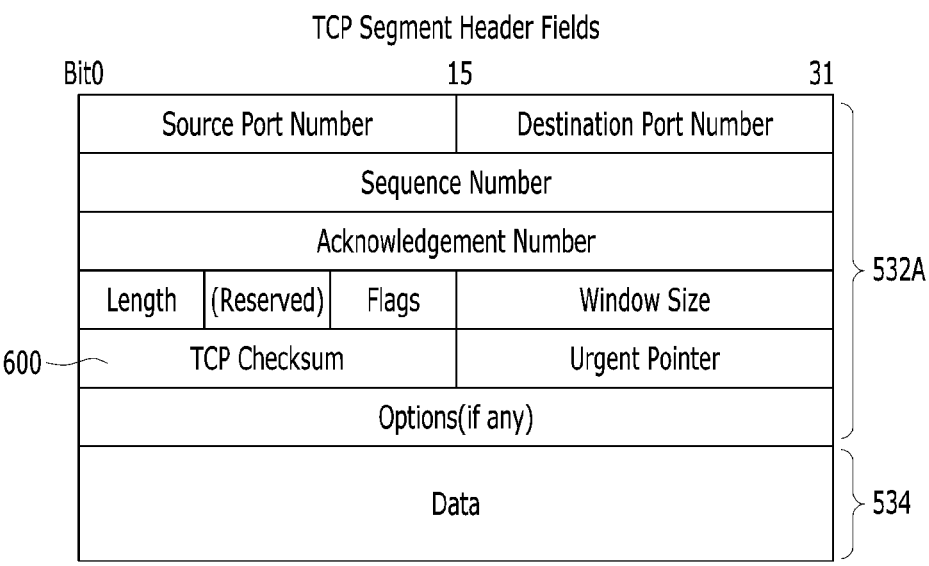

FIGS. 6A and 6B are diagrams illustrating structures of transmission control protocol (TCP) segment headers in accordance with an embodiment of the present disclosure. For example, the TCP segment header 532A of FIG. 6A may be generated by the processing unit 320 of the embedded device 150, and the TCP segment header 532B of FIG. 6B may be generated by the processing unit 420 of the host device 250. Since the fields of the TCP headers are well known, the detailed description regarding the fields of the TCP headers will be omitted.

Referring to FIG. 6A, the TCP segment may include a header 532A with no checksum value and a data 534. The TCP segment header 532A may include a source port number, a destination port number, a sequence number, an acknowledgement number, a length, flags, a window size, an urgent pointer, a reserved filed and an option field.

Referring to FIG. 6B, the TCP segment may include a header 532B with TCP checksum value 600 and a data 534. The TCP segment header 532B may include the source port number, a destination port number, a sequence number, an acknowledgement number, a length, flags, a window size, a TCP checksum value 600, an urgent pointer, a reserved filed and an option field. In contrast to the TCP segment header 532A, the TCP segment header 532B further includes the TCP checksum value 600.

With such a system in place, it may take full advantage of industry standard internee security protocols, multiple; ports for multiple services and potentially define a whole new set of products to manage our hardware in a data center.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system comprising:
an embedded device configured with reduced processing resources and to provide a packet for a service in response to a request from a host device, generate a first transmission control protocol (TCP) segment including a piece of the packet with no checksum value and a first header with no checksum value, and transmit the first TCP segment, including both the piece of the packet and the first header together, through an interconnection, wherein, to reduce processing load of the embedded device, the embedded device does not compute any TCP checksum for either the piece of the packet or the first header and the transmitted first TCP segment contains no checksum information;
the interconnection coupled between the embedded device and host device; and
the host device configured to receive the first TCP segment through the interconnection from the embedded device, the host device comprising one or more processors configured to generate a second TCP segment including the piece of the packet and a second header with a checksum value based on the piece of the packet and the first header, perform internet protocol (IP) routing, and generate an IP packet based on the second TCP segment.

2. The system of claim 1, wherein at least one of the one or more processors is further configured to generate a transmission frame based on the IP packet, and transmit the transmission frame to a network.

3. The system of claim 1, wherein the embedded device is coupled to the host device through the interconnection including a serial interconnection.

4. The system of claim 3, wherein the serial interconnection includes a serial interface based on an automation/drive interface-transport (ADT) protocol.

5. The system of claim 1, wherein the embedded device includes a solid state drive (SSD).

6. The system of claim 5, wherein the service includes at least one smart counter harvesting service of a load profile service, drive health monitor, capacity used monitor, bad block count profile, end of life alert service or drive configuration service.

7. A method for operating an embedded system including an embedded device with reduced processing resources, a host device, and an interconnection coupled between the embedded device and host device, the method comprising:
providing, by the embedded device, a packet for a service in response to a request from the host device;
generating, by the embedded device, a first transmission control protocol (TCP) segment including a piece of the packet with no checksum value and a first header with no checksum value, wherein, to reduce processing load of the embedded device, the embedded device does not compute any TCP checksum for either the piece of the packet or the first header;
transmitting, by the embedded device, the first TCP segment, including both the piece of the packet and the first header together, through the interconnection, wherein the transmitted first TCP segment contains no checksum information;
receiving, by the host device, the first TCP segment through the interconnection from the embedded device;
generating, by one or more processors of the host device, a second TCP segment including the piece of the packet and a second header with a checksum value based on the piece of the packet and the first header;
performing, by at least one of the one or more processors of the host device, internet protocol (IP) routing; and
generating, by at least one of the one or more processors of the host device, an IP packet based on the second TCP segment.

8. The method of claim 7, further comprising:
generating, by at least one of the one or more processors of the host device, a transmission frame based on the IP packet; and
transmitting, by at least one of the one or more processors of the host device, the transmission frame to a network.

9. The method of claim 7, wherein the embedded device is coupled to the host device through the interconnection including a serial interconnection.

10. The method of claim 9, wherein the serial interconnection includes a serial interface based on an automation/drive interface-transport (ADT) protocol.

11. The method of claim 7, wherein the embedded device includes a solid state drive (SSD).

12. The method of claim 11, wherein the service includes at least one smart counter harvesting service of a load profile service, drive health monitor, capacity used monitor, bad block count profile, end of life alert service or drive configuration service.

13. A host device coupled to an embedded device with reduced processing resources through an interconnection and coupled to a network, comprising:
an interface unit configured to receive, from the embedded device through the interconnection, a first transmission control protocol (TCP) segment including a piece of a packet for a service in response to a request from the host device and a first header, wherein each of the piece of the packet and the first header has no checksum value included therewith, and the piece of the packet and the first header are transmitted and received together;

a TCP checker configured to calculate a checksum value based on the piece of the packet and the first header, and generate a second TCP segment including the piece of the packet and a second header with the checksum value;

an IP router configured to perform internet protocol (IP) routing, and generate an internet protocol (IP) packet based on the second TCP segment; and an IP packet generator configured to generate a transmission frame based on the IP packet, and transmit the transmission frame to the network.

14. The device of claim 13, wherein the interface unit includes a serial interface based on an automation/drive interface-transport (ADT) protocol.

15. The device of claim 13, wherein the embedded device includes a solid state drive (SSD).

16. The device of claim 15, wherein the service includes at least one smart counter harvesting service of a load profile service, drive health monitor, capacity used monitor, bad block count profile, end of life alert service or drive configuration service.

* * * * *